Sept. 18, 1928. 1,685,072
D. C. KLAUSMEYER
MOBILE RADIAL DRILL
Filed Oct. 8, 1924 5 Sheets-Sheet 2
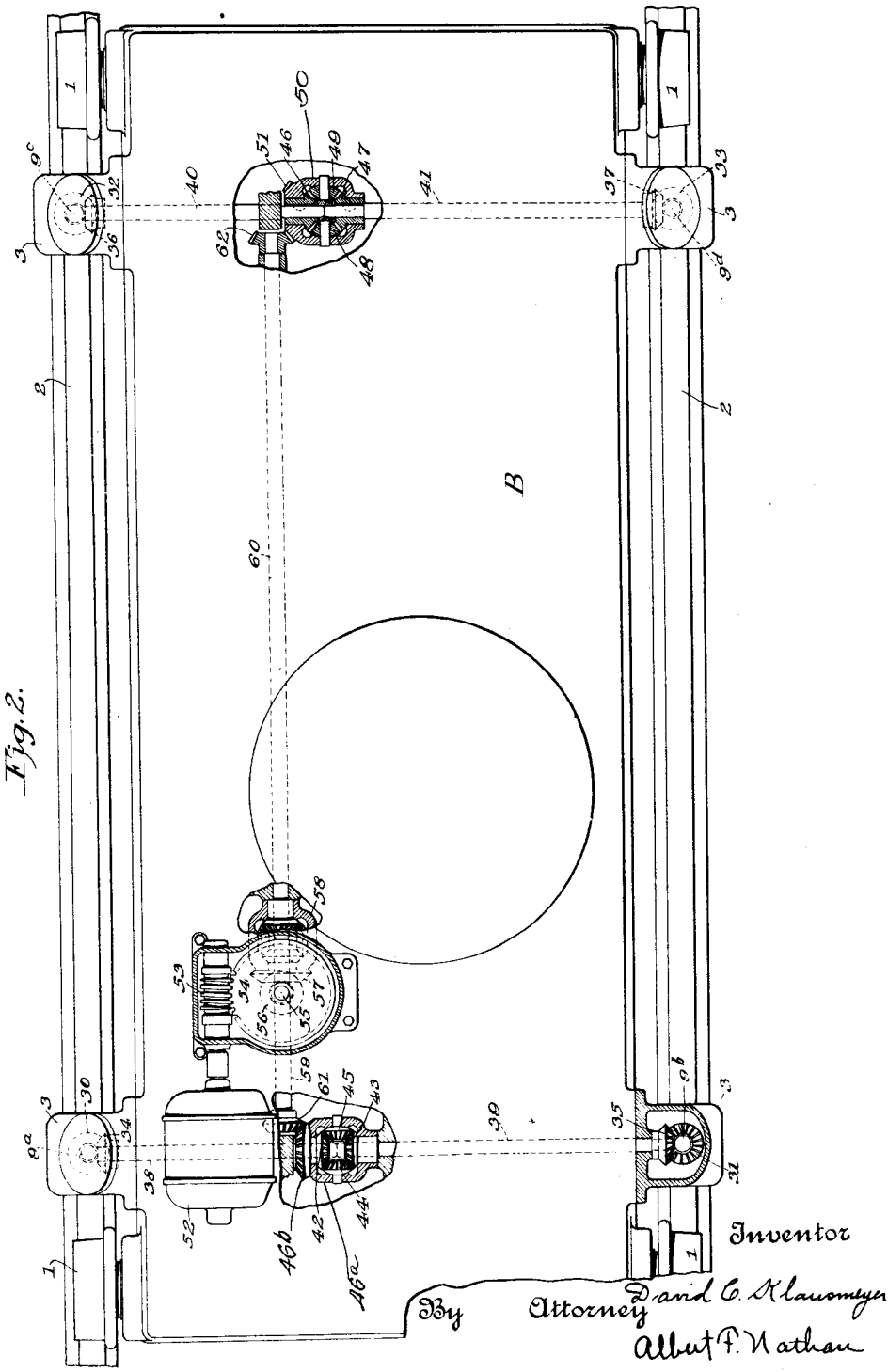

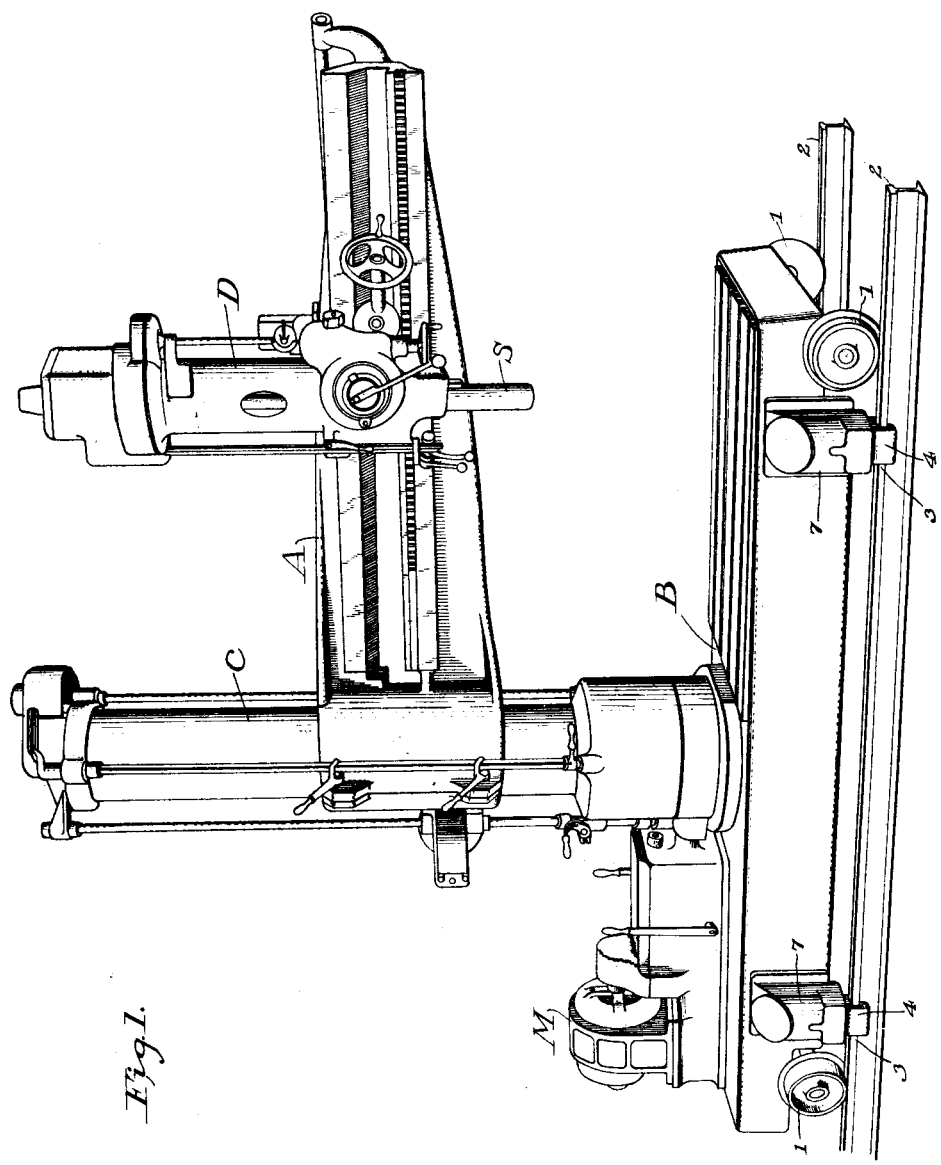

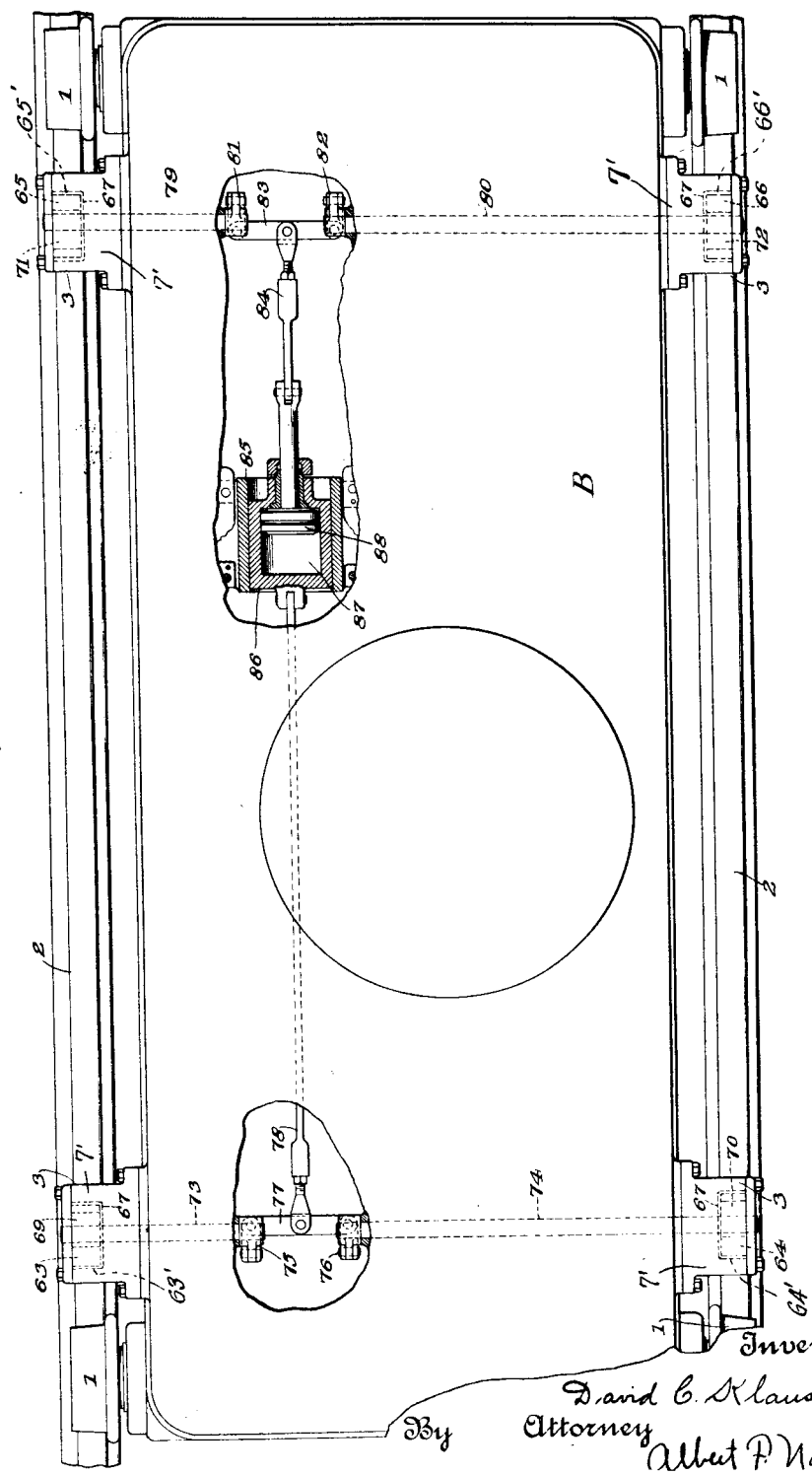

Sept. 18, 1928.
D. C. KLAUSMEYER
MOBILE RADIAL DRILL
Filed Oct. 8, 1924
1,685,072
5 Sheets-Sheet 4
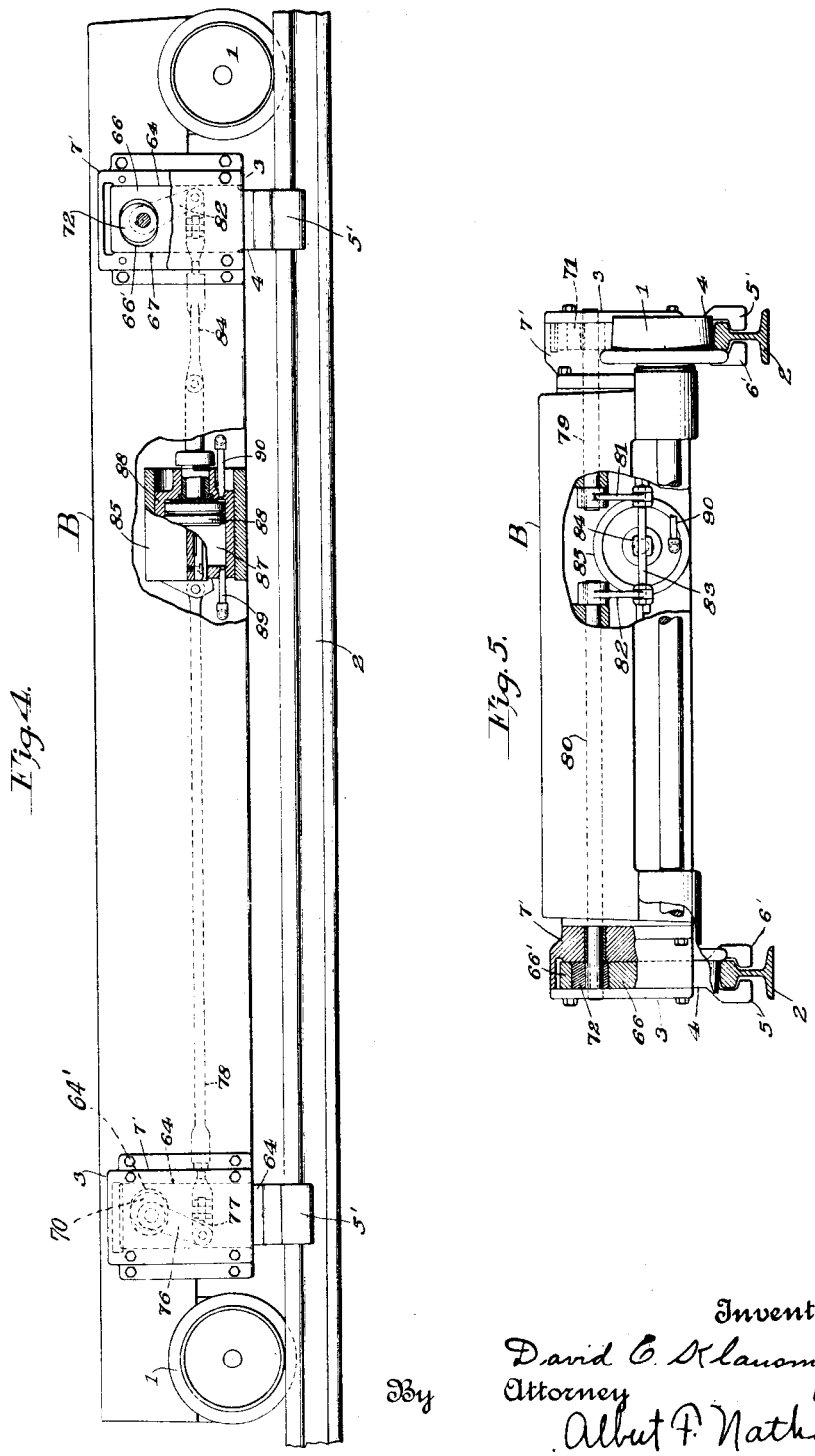
Inventor
David C. Klausmeyer
By Attorney
Albert F. Nathan Sept. 18, 1928.  
D. C. KLAUSMEYER  
1,685,072  
MOBILE RADIAL DRILL  
Filed Oct. 8, 1924  5 Sheets-Sheet 5
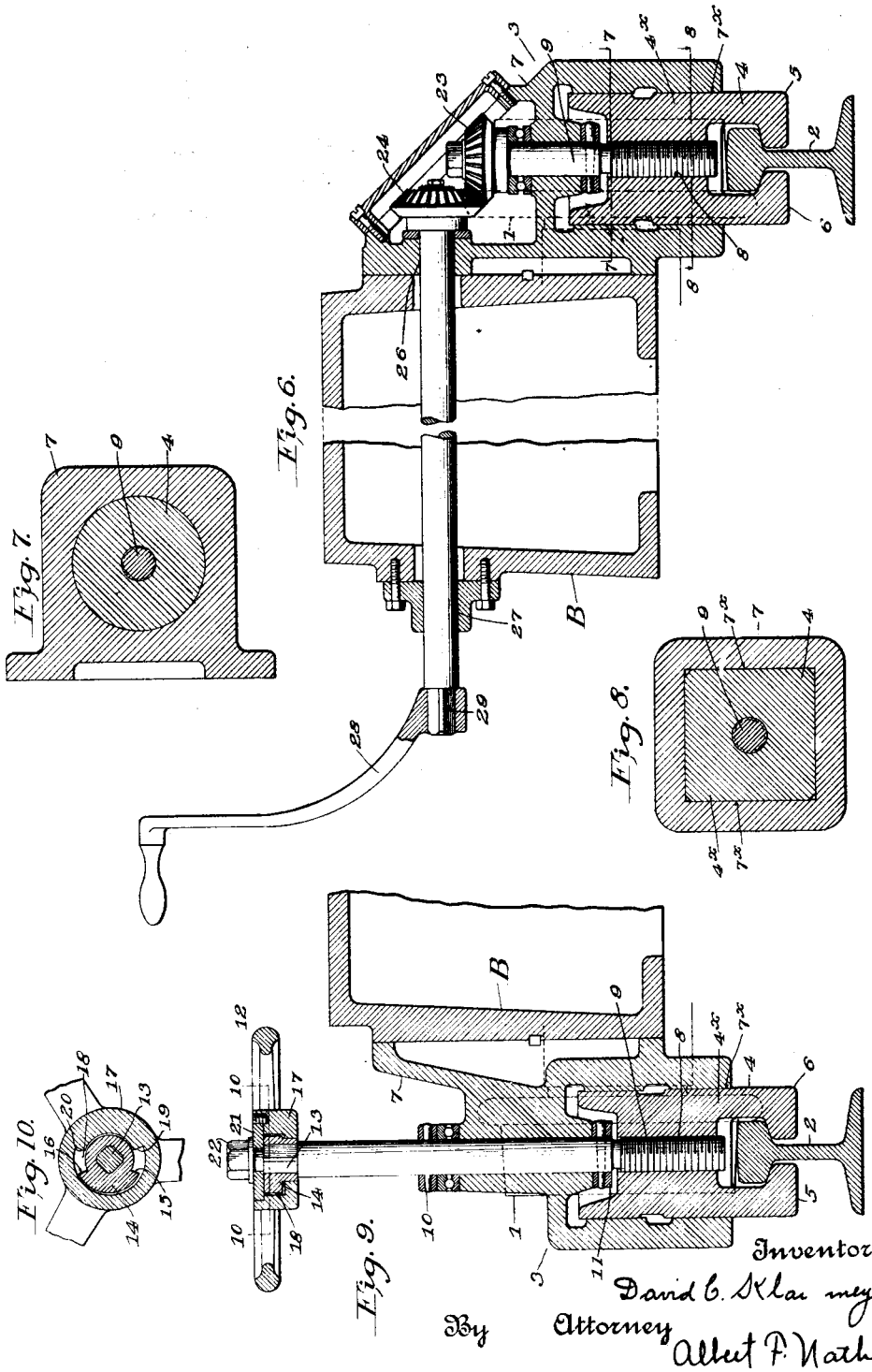

Patented Sept. 18, 1928.

1,685,072

UNITED STATES PATENT OFFICE.

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO.

MOBILE RADIAL DRILL.

Application filed October 8, 1924. Serial No. 742,376.

This invention relates to machine-tools and more particularly to means for facilitating the transportation of machine-tools from one place to another and for securely maintaining them in any desired location.

Usually machine-tools are maintained in a fixed position, being secured upon a suitable foundation or floor, and the work to be operated on is brought to the machine-tool. There are, however, certain times and conditions, such as when very large work is to be machined, which make it desirable to have the machine-tool capable of being moved bodily, whereby it may be taken to the work, may be moved relatively thereto during a machining operation, or for any other reason may be moved about the plant.

This invention therefore has for an object so to construct a normally stationary type of machine-tool that it readily may be moved from one place to another.

Another object of this invention is to provide means for securely maintaining the machine-tool in any desired location and to hold it against strains tending to overturn it.

A further object of the invention is to provide a plurality of locking devices to hold a machine-tool in any desired location and to provide power means for actuating the locking devices.

Still another object is to provide a plurality of power-actuated locks for holding a machine-tool against movement and so to control the power therefor that all of the locks will be actuated simultaneously and to the same degree.

A still further object of the invention is to provide transportation means for a machine-tool whereby the tool may be moved bodily, to provide a plurality of power-actuated friction grips for securing the machine-tool in any desired location, and to coordinate with the power-actuating mechanism an equalizing device to cause said grips to be actuated equally.

A radial-drill is one type of machine-tool to which the present invention is adaptable and the invention will therefore be disclosed in connection with such a machine-tool merely as one practical embodiment thereof. It is to be understood, however, that the invention is likewise adaptable to various other types of machine-tools.

These objects have been attained in a machine-tool constructed with a base which supports the various other parts of the tool and which may also carry the power means for actuating the machine-tool. This base is not, as is customary, provided with means to anchor the machine-tool down permanently but inasmuch as it is adapted to be moved relatively to the work or from place to place it is preferably provided with means to facilitate such transportation. This means may consist of suitable wheels, rollers or other antifriction devices and these devices are preferably caused to cooperate with a permanent way, such as, for example, spaced tracks which may be laid to any desired destination. Thus the machine-tool is so supported that it may be moved, under any suitable power, relative to the work or to any part of the plant.

The machine tool having been moved to any desired place it is necessary that it be firmly secured in its view position to prevent its movement during the operation thereof. This invention therefore provides suitable locking devices which when suitably actuated serve to secure the machine-tool against movement and to prevent its overturning. These locking devices may conveniently comprise a plurality of friction-clamps adapted to engage either the permanent way or any other suitable stationary object, and either manual or power means for actuating the clamps. When power means is utilized it is preferably supplied from a single source and suitable equalizing devices are located intermediate the source of power and the clamps to cause power to be evenly distributed to all of said clamps whereby the gripping action of all of them will be the same.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a perspective view of a radial-drill embodying the present invention. Fig. 2 is a plan of a radial-drill base embodying the invention and showing one form of power means for actuating all of the clamping devices, together with equalizing devices in the power drive. Fig. 3 is a view similar to Fig. 2 but showing fluid actuated power means for controlling the clamping devices. Fig. 4 is a side view of Fig. 3 certain parts being broken away better to illustrate the invention. Fig. 5 is an end view of Fig. 4, also with certain parts broken away. Fig. 6 is a vertical section showing one form of manual means for actuating the clamping devices. Fig. 7 is a section on the line 7—7 of Fig. 6. Fig. 8 is a section on the line 8—8 of Fig. 6. Fig. 9 is a vertical section of another form of manual means for actuating the clamping devices. Fig. 10 is a detail section on the line 10—10 of Fig. 9.

Referring more particularly to the drawings the invention is disclosed as associated with a radial drill comprising a column C, radial-arm A and the usual drill-head D adjustably mounted on the arm. Within the drill-head is journaled a spindle S adapted to receive a drill-point or other suitable tool. Power to translate the arm vertically on the column and to rotate the spindle may be provided by a motor M, or other prime-mover, preferably located at the foot of the column and such power may be controlled by suitable mechanism which, being conventional, need not be described. Machine-tools of this type are usually provided with or mounted upon a base which in turn is secured to a suitable stationary foundation or floor. A base of this nature is illustrated at B which, however, when used in connection with the present invention is not permanently secured in any definite position but which instead is adapted to be moved relative to its support. This invention relates particularly to the means permitting transportation of the base and means for securing it either temporarily or permanently in any desired location. Obviously any type of machine-tool could be so mounted, transported and secured in position, therefore it is to be understood that the invention is adaptable to various other machine-tools and is not limited to radial-drills.

To facilitate the transportation of the machine its base is preferably provided with suitable anti-friction devices such as, for example wheels or rollers 1. Preferably these anti-friction devices are guided to move in a predetermined path. This may conveniently be accomplished by forming the wheels with side flanges and fitting them upon suitable tracks such as the rails 2. Adjacent the wheels 1 the base is provided with locking devices 3 which, when the base and the machine-tool thereon has been moved to any desired location, may be actuated to secure the base to some immovable object such as, for example, the rails 2. These locking devices preferably comprise vertically movable clamping blocks 4 having jaws 5 and 6 adapted upon upward movement to engage the under-side of the head of the rail 2. Thus the rail-head is gripped between the lower surface of the wheels 2 and the jaws 5 and 6 and the machine base is held against movement both vertically and horizontally.

These blocks 4 are fitted within heavy brackets secured to the base B and are held against rotary movement therein in any suitable manner. As shown in Figs. 7, 8 and 9 this may be accomplished by forming the blocks with polygonal portions 4× and fitting them within similarly shaped sockets 7× in the brackets. Thus the blocks are held against rotation and the jaws 5 and 6 are therefore prevented from binding upon the webs of the rails 2.

An important feature of this invention resides in the employment of the double gripping jaws 5 and 6 adapted simultaneously to grip the rail head at opposite sides of the central web, thereby drawing the machine base firmly to the rails without creating any side strain on the clamping mechanism or on the rail.

As hereinbefore stated either manual means or power means may be utilized to actuate the clamps. Figs. 9 and 10 illustrate one simple and effective means for accomplishing this result manually. In this form the blocks 4 are vertically movable in brackets 7 secured to the base B. Each of these blocks are provided with a threaded aperture 8 into which is threaded a screw 9 held against endwise movement in the bracket 7 by collars 10 and 11. Upon the upper end of the screw is carried a hand-wheel 12 by means of which the screw may be manually rotated. To effect a final tightening of the clamp and to release it when it is desired to move the machine, the wheel is preferably secured to the screw 9 by means of a lost motion connection which permits a partial rotation of the wheel relative to the screw whereby the wheel may be caused to strike a hammer blow on the screw to give it a final or initial rotary movement. This may be effected by securing upon the upper end of the screw, as by fitting it to a squared end 13, a sector 14 affording radial walls 15 and 16. The hub 17 of the wheel 12 is formed with a cavity 18 larger than the sector and within which the latter is held. This cavity 18 terminates at one end in a stop-wall 19 adapted in one direction of rotation of the hand-wheel to engage the wall 15. The opposite end of the cavity affords a wall 20 adapted to contact with the wall 16 when the hand-wheel is rotated in the opposite direction. Due to the lost motion between the wall 15 and 19, and 16 and 20 these walls may be brought together forcibly to produce a final setting or an initial release of the clamp. A cover-plate 21 and a nut 22 serve to hold the parts in their assembled relation.

Another manual means for rotating the screw to actuate the clamp is disclosed in Figs. 6, 7 and 8. This comprises a bevel-gear 23 fixed to the screw 9 and a like gear 24 carried by a shaft 25 journaled in bearings 26 and 27 supported by the base B. This shaft may be rotated as by means of a crank 28 fitted to the squared end 29 thereof.

As hereinbefore stated these clamps also may be actuated by power. Fig. 2 discloses one power means for actuating all of the clamps simultaneously and for equalizing the gripping effect of all of the clamps. In this construction the clamp-actuating screws $9^a$, $9^b$, $9^c$ and $9^d$ carry bevel-gears 30, 31, 32 and 33 respectively, which mesh with like gears 34, 35, 36 and 37 secured upon the outer ends of shafts 38, 39, 40 and 41 journaled in bearings supported by the machine base. The clamp actuating screws $9^a$, $9^b$, $9^c$ and $9^d$, the rail clamping blocks and the bearing brackets for the blocks are constructed and arranged the same as shown in Fig. 6, the only difference between the constructions shown in Figs. 2 and 6 being that in Fig. 2 the shaft that carries the driving bevel gear is actuated by power whereas in the other it is actuated manually. Fixed upon the inner ends of the shafts 38 and 39 are gears 42 and 43 which mesh with floating pinions 44 and 45 journaled in a rotatable casing $46^a$ integral with a driving-gear $46^b$. These gears, pinions and casing constitute a differential drive of conventional form which equalizes the action between shafts 38 and 39. The shafts 40 and 41 are likewise connected together by means of a similar equalizing device or differential gearing comprising gears 46 and 47, pinions 48 and 49 casing 50 and a driving gear 51.

Power to rotate the shafts 38, 39, 40 and 41 simultaneously to actuate all of the clamps 3 may be provided by a motor 52 carried by the base B. This motor preferably rotates a worm 53 which meshes with and turns a worm-wheel 54 fixed to a vertical shaft 55. The shaft 55 carries a bevel-gear 56 in mesh with a bevel-gear 57 forming a part of a third differential gearing or equalizing device indicated generally as 58. The differential 58 is adapted to drive two longitudinal shafts 59 and 60 of which the former carries a gear 61 in mesh with the gear 42 and the latter carries a gear 62 which drives the gear 51. From the foregoing it will be understood that rotation of the worm 53 in one direction by the motor will, through the mechanism described, actuate all of the clamps simultaneously and with equal pressure. The motor 52 preferably is of the reversible type and therefore may cause reverse rotation of the worm 53 to release the clamps.

Figs. 3, 4 and 5 show still another form of power means for simultaneously actuating the clamps with an equal amount of pressure. In this form the clamping jaws 5' and 6' are formed integral with slide-blocks 63, 64, 65 and 66 vertically movable in guideways 67 formed in the brackets 7' secured to the base B. The blocks are formed with apertures 63', 64', 65' and 66' respectively, within which are fitted eccentrics 69, 70, 71 and 72. The eccentrics 69 and 70 are carried by coaxial shafts 73 and 74 journaled in bearings carried by the base and to these shafts are secured rock-arms 75 and 76 respectively. An equalizing bar 77 is pivotally connected at its opposite ends with the rock-arms 75 and 76 and serves, when moved in one direction under the influence of a connecting rod 78, to oscillate the shafts 73 and 74 thereby to lift the blocks 63 and 64 and close the clamps with equal pressure. The eccentrics 71 and 72 are secured upon shafts 79 and 80 carrying rock-arms 81 and 82 likewise connected together by an equalizing bar 83 pivoted intermediate its ends to a connecting rod 84. The connecting rods 78 and 84 may be moved lengthwise, to effect the closing and opening of the clamps, by fluid actuated means now to be described.

Supported from the underside of the upper wall of the base B is a cylinder 85 within which is slidably mounted a second cylinder 86 having a pivotal connection with the connecting rod 78. The cylinder 86 provides an internal bore 87 within which is slidingly fitted a piston 88 operatively connected with the connecting rod 84. Fluid under pressure may be admitted into the cylinder 86 at either side of the piston 88 as by means of pipes 89 and 90. As shown in Figs. 4 and 5 the clamping devices are released. Now if by the manipulation of a suitable valve, (not shown), pressure is admitted into the cylinder 86 through pipe 90 the piston 88 will be moved to the left (Fig. 4) and the cylinder 86, being slidably mounted in the cylinder 85, will, simultaneously with the movement of the piston, be moved to the right. This will cause the connecting rods 78 and 84 to be drawn toward each other which in turn will as hereinbefore described effect rotation of the shafts 73, 74 and 79, 80 thereby rotating the eccentrics 69, 70, 71, 72 and causing them to close the clamps on the rails 2. When it is desired to release the clamps pressure may be admitted through the pipe 89 which will cause all of the parts to be moved in the opposite direction and the clamping jaws to release the rails.

From the foregoing it will be seen that this invention provides a simple and efficient mounting for machine-tools whereby they may be moved from place to place and also various forms of clamping devices for maintaining the machine-tool in any desired position. It will also be seen that in both of the power means disclosed for actuating the clamping devices all of the clamps are actuated simultaneously and the equalizing devices insure that they will all function equally.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. In combination with a machine-tool; a base; a support for said base; means permitting said base to be moved on its support; a plurality of sets of locking devices adapted to secure said base against movement; power means for actuating said locking devices; an equalizing device between said power means and each set of locking devices; and equalizing means between the locking devices in each set.

2. In a machine-tool; a base; a track upon which the base is mounted; a clamping device adapted to prevent movement of said base on said track; said clamping device comprising a bodily movable member having a jaw adapted to engage beneath the head of said track; a screw having a threaded connection with said jaw and means to rotate said screw to cause it to draw said jaw into engagement with the underside of the head of said track.

3. In a machine-tool; a base; a track upon which the base is mounted; a plurality of clamping devices adapted to prevent movement of said base on said track, each of said clamping devices comprising a bodily movable member having a jaw adapted to engage beneath the head of said track, a screw having a threaded connection with said member; and power means operatively connected to rotate all of said screws to cause all of said jaws to be moved vertically to grip beneath the head of said track simultaneously.

4. In a machine-tool, a base; a track upon which said base is supported; a plurality of clamping devices adapted to prevent movement of said base on its support, each of said clamping devices comprising a bodily movable member having a jaw adapted to engage beneath the head of said track; a screw having a threaded connection with said member; power means operatively connected to rotate all of said screws to cause all of said jaws to grip said track simultaneously; and equalizing devices between the source of power and said screws whereby said clamping devices are all actuated equally.

5. In a machine-tool, a base; a track upon which said base is supported; a plurality of clamping devices adapted to prevent movement of said base on its support, each of said clamping devices comprising a movable member having a jaw adapted to engage said track; a screw having a threaded connection with said member; power means operatively connected to rotate all of said screws to cause all of said jaws to grip said track simultaneously; and equalizing devices comprising differential gearing between the source of power and said screws whereby said clamping devices are all actuated equally.

6. In a machine-tool; a base; a support for said base; a plurality of pairs of clamping devices for securing said base to its support; an operative connection between the clamping devices of each pair; an equalizing device included in said connection; power means operatively connected to actuate all of said clamping devices; and equalizing devices between said pairs of clamping devices.

7. In combination with a machine-tool base, a rail beneath the base; a bearing bracket secured to the side of said base; a clamping block vertically adjustable in said bracket and having jaws extending downwardly beside and laterally beneath the head of said rail; a screw rotatably mounted in said bracket and having a threaded connection with said block; means to rotate said screw to move said block transversely to said track; and means to prevent twisting of said block.

8. In combination with a machine tool; a base; a support for said base; means permitting said base to be moved on its support; a plurality of sets of locking devices adapted to secure said base against movement; means for actuating said locking devices; an equalizing device between said actuating means and each set of locking devices; and equalizing means between the locking devices in each set.

In witness whereof, I hereunto subscribe my name.

DAVID C. KLAUSMEYER.